United States Patent [19]

Smith

[11] 4,039,742
[45] Aug. 2, 1977

[54] WATERPROOF CABLE SPLICE ENCLOSURE KIT

[75] Inventor: Bert A. Smith, Northridge, Calif.

[73] Assignee: Preformed Line Products Company, Cleveland, Ohio

[21] Appl. No.: 526,222

[22] Filed: Nov. 22, 1974

[51] Int. Cl.² .................. H02G 15/08; H01R 5/12
[52] U.S. Cl. ................................. 174/87; 174/76; 215/227; 215/286; 215/321; 339/246
[58] Field of Search ............. 174/87, 76, 91-93, 174/77 R, 82, 138 F; 339/103 R, 103 C, 103 M, 114, 115 R, 115 C, 116 R, 116 C, 209, 246; 215/320, 321, 227, 228, 286, 354; 220/307, 306

[56] References Cited

U.S. PATENT DOCUMENTS

| 423,928 | 3/1890 | Howe | 215/286 |
|---|---|---|---|
| 2,105,791 | 1/1938 | Mascuch | 174/355 M X |
| 2,558,987 | 7/1951 | Shaw | 215/227 X |
| 3,597,528 | 8/1971 | Penfield et al. | 174/87 |
| 3,806,630 | 4/1974 | Thompson et al. | 174/87 X |
| 3,919,460 | 11/1975 | Neail et al. | 174/87 |
| 3,934,076 | 1/1976 | Smith | 174/87 |
| 3,937,870 | 2/1976 | Bumpstead et al. | 174/87 |

FOREIGN PATENT DOCUMENTS

| 693,832 | 9/1930 | France | 339/246 |
|---|---|---|---|
| 1,334,993 | 7/1963 | France | 174/82 |

Primary Examiner—Laramie E. Askin
Attorney, Agent, or Firm—Lyon & Lyon

[57] ABSTRACT

There is disclosed herein a novel waterproof cable splice enclosure for protecting cable splices and the exposed cable ends associated with the cable splice. The enclosure is comprised of a cap having apertures therethrough for receiving the cables, a clamp for holding the cables, a vial containing a moisture-proof sealant, a sleeve coaxially disposed within the vial when the enclosure is assembled and means for securing the cap to the vial. The enclosure is most useful in protecting the cable splices which are comprised of a plurality of simple wire conductors and associated splicing means.

3 Claims, 5 Drawing Figures

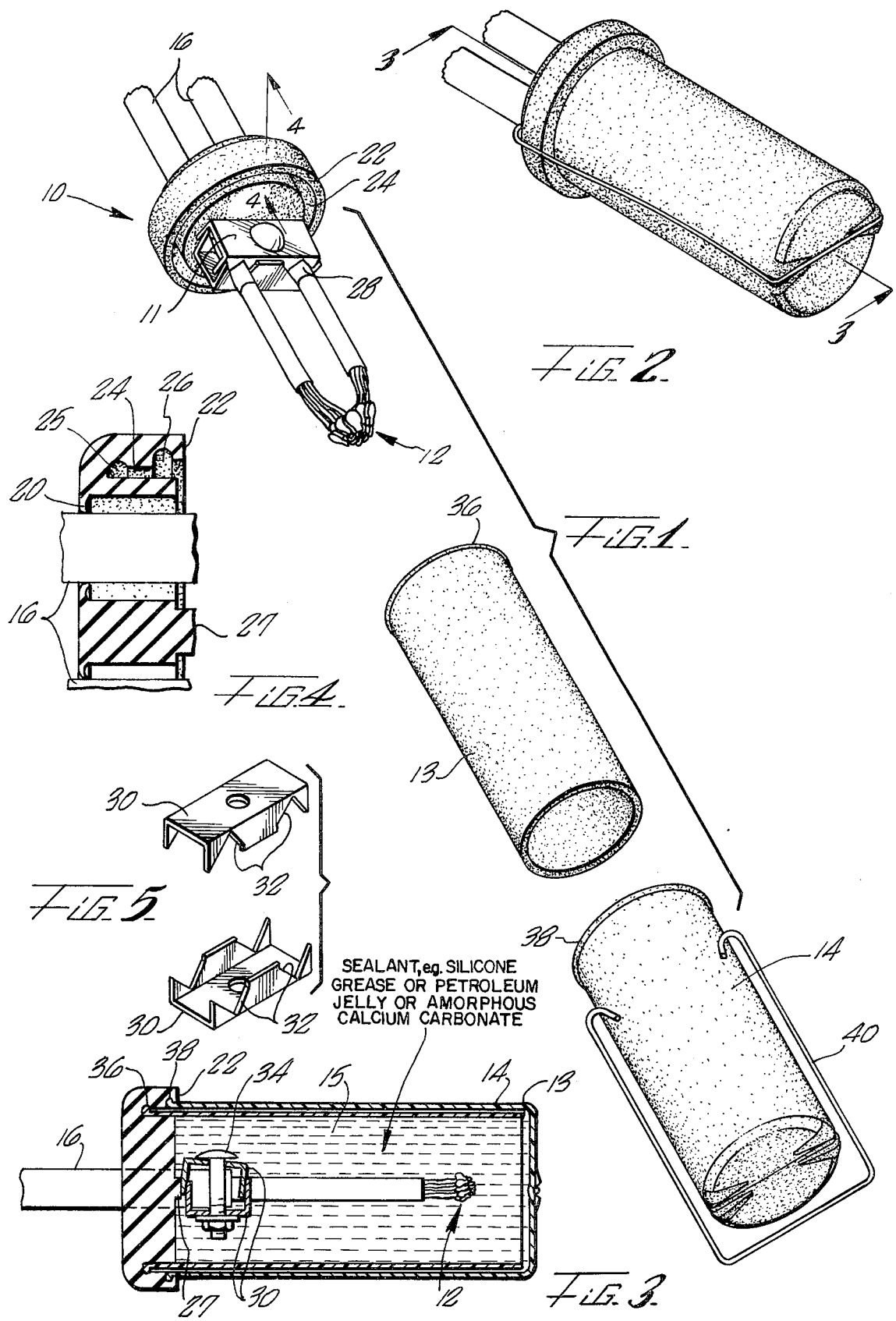

WATERPROOF CABLE SPLICE ENCLOSURE KIT

BACKGROUND OF THE INVENTION

There are many instances where an electrical cable splice must be insulated and protected from the effects of the environment in which it is used. For example, in splicing a telephone service cable to the main cable, particularly in underground installations, protection must be afforded against the deleterious effects of moisture, not only on the electrical connection itself, but on the long lengths of the cable which the moisture may reach as a result of the effects of hydrostatic pressure and capillary action.

One of the prior art methods of protecting cable splices from the environment is disclosed in U.S. Pat. No. 2,906,810. The method involves inserting the splice into a cylindrical capsule which is filled with a pliable plastic water proofing insulating material. A plug which has circumferentially spaced peripheral grooves is used to seal the opened end of the cylindrical capsule. The spliced cables are twisted around the plug with the cables positioned in the grooves and the splice positioned in front of the plug. Then the plug and the splice are inserted into the cylindrical capsule forcing the insulating material around the cable splice. Unfortunately, the resultant enclosure is not sufficiently moisture proof to withstand an underground environment. The enclosure also lacks means for securing the splice within the capsule and therefore the splice becomes disassembled when tension is placed on the cables.

Another prior art method of protecting cable splices from the environment is disclosed in the patent of Donald J. Smith, U.S. Pat. No. 3,934,076, assigned to the assignee of the present application. The protection is accomplished by utilizing an enclosure which is capable of rigidly fixing two or more spliced cables within the enclosure and protecting the ends of these cables and the associated cable splice from moisture. The enclosure is comprised of a pair of mating plug members having cap portions and a vial which is prefilled with a water immiscible sealant. The enclosure is assembled by first disposing the plug members around the spliced cables thereby rigidly fixing the splice and cables with respect to the plug. The plug is then inserted into the vial thereby immersing the splice and cable ends in the sealant. The cap portion of the plug members is then securely affixed to the vial by threaded engagement. The resultant enclosure affords the splice protection from moisture and from the appliation of tension to the cables. While this device has been generally quite satisfactory, it has been discovered that when one attempts to insert into the sealant a cable splice consisting of a relatively large number of quite flexible conductors and their associated connectors, the wires of the slice become displaced and disconnected. This is due to the fact that the conductors and associated connectors comprise a large mass and therefore the splice cannot be easily inserted into the sealant without bending and breaking these fragile wires. Moreover, it is difficult to keep these wires and connectors in a compact enough mass to permit easy insertion into the vial. Since the use of multiconductor service cables is becoming increasingly frequent, a more easily handled enclosure assembly has been sought.

SUMMARY OF THE INVENTION

It is therefore an object of the present invention to provide a moisture-proof cable splice enclosure which can be readily used to protect a cable splice consisting of a plurality of conductors and associated connectors.

These and other objects and advantages are obtained by utilizing a moisture-proof cable splice enclosure comprised of a cap, a sleeve, a clamp and a vial which is prefilled with a water immiscible sealant. The enclosure is assembled by first inserting the cables through apertures formed in the cap. The cables are then spliced together and a clamp is disposed around the spliced cables thereby rigidly fixing the cables together. The splice and clamp are then inserted into the sleeve which attaches to the cap, the sleeve serving to retain the wires and connectors. The assembly comprising the cap, sleeve, clamp and splice can then be readily inserted into the prefilled vial. The wall of the sleeve serves to protect the simple wire conductors and associated connectors from becoming displaced and disconnected upon contact with the sealant. The wall also prevents the wires and connectors from being pushed out over the edge of the vial. The resultant enclosure affords the entire splice protection from moisture and also prevents any tension forces exerted on the cables from being transferred to the splice itself.

BRIEF DESCRIPTION OF DRAWINGS

A more thorough disclosure of the objects and advantages of the present invention is presented in the detailed description which follows and from the accompanying drawings in which:

FIG. 1 is an exploded perspective view of the cable splice enclosure with two cables spliced together;

FIG. 2 is an assembled view of the moisture-proof cable splice enclosure of the present invention;

FIG. 3 is a cross sectional view of the cable splice enclosure taken along lines 3—3 of FIG. 2;

FIG. 4 is a partial cross-section of the cap along line 4—4 of FIG. 1;

FIG. 5 is an exploded perspective view of the clamp.

DETAILED DESCRIPTION OF THE INVENTION

The drawings illustrate the preferred embodiment of an enclosure according to the present invention. Referring to FIGS. 1, 2 and 3, there is shown an enclosure comprising generally a cap 10, a clamp 11, a splice 12, a sleeve 13 and a vial 14 which is prefilled with a body of sealant 15.

The enclosure is assembled by inserting the cables 16 through apertures in the cap and splicing their individual condutors together by means of any suitable connectors to form a splice shown schematically at 12. The clamp 11 is then disposed around the cables 16 thereby rigidly fixing the cables together. The sleeve 13 is then slipped over the splice and the clamp and attached to cap 10 to form a protective enclosure for the conductors and splice. The assembly comprising the cap, splice and sleeve is then telescopically inserted into the body of sealant in the vial 14.

Describing now the various elements of the enclosure in more detail, FIG. 4 shows a preferred form of the cap 10. As can be seen, the cap 10 has chevron seals 20 which are made of a flexible material and enable the cap to receive cables 16 of different sizes. The cap 10 is also provided with a side wall or rim 22 which defines an annular channel 24. Grooves 25 and 26 are formed on the inner circumferential side of the rim 22 for receiving the sleeve 13 and vial 14 respectively. A knob 27 is formed at the center of cap 10 and functions to hold clamp 11 away from the cap to insure that the sealant fills all voids in the vial. The cap is preferably made of polyvinylchloride.

The clamp 11 functions to establish electrical contact between the shields 28 of cables 16 and also to mechanically lock the cables together thereby providing a high pull-out strength to the cables. As shown in FIG. 5, the clamp 11 is comprised of two U-shaped members 30, each member having two V-shaped notches 32 formed on each arm of the member. These notches function to receive the ends of the cables and their V-shape enables them to accommodate cables of different sizes. As shown in FIG. 3, when assembled, the members 30 of the clamp are held together by a nut and bolt 34. The members 30 can rock along two axes thereby enabling the clamp to firmly grip both the cable jacket and shield of cable 16.

The sleeve 13 having two open ends is provided with lip 36 on one end thereof and is preferaby made of a molded polyethylene. Although it is preferable that the cap and sleeve be formed separately, it is, of course, possible to form them as an integral unit. A vial 14 is provided with one open end which has lip 38 formed on the rim thereof and is prefilled with a specific amount of sealant 15. The vial 14 is preferably made of a molded polyethylene. The sealant 15 is preferably a silicone grease or a petroleum jelly, but may be any other suitable substance which is not miscible with water and which does not set up but rather stays flowable for the normal life of the splice. It has also been found that an amorphous composition of calcium carbonate or powdered chalk is sufficiently non-miscible with water to be used as the sealant. Calcium carbonate compounded to provide optimum results is sold under the trade names of Protex-E and Protexulant. A suitable sealant having a petroleum base with no melted polyethylene is sold commercially under the trade name Jel-Pak by G.F.C. Engineering Corporation of Los Angeles, California.

Referring to FIG. 1, the enclosure is assembled by first inserting the cables 16 through the chevron seals 20 of cap 10 and splicing the individual conductors of the cables together by any conventional connectors to form cable splice 12. The cables are then securely locked into clamp 11 by positioning cables 16 in the V-shaped notches 32 of members 30 and tightenng nut and bolt 34. The assembly of the cap, cables and clamp is then inserted into sleeve 13 until lip 36 of the sleeve 13 achieves locking engagement with groove 25 of cap 10. The assembly is then telescopically inserted into vial 14 containing sealant 15. Sleeve 13 functions to prevent the sealant which is being displaced by the cable splice 12 and the clamp 11 from spilling out over the sides of the vial. Some of the grease may be, however, eventually forced out of the assembly through the chevron seals.

More importantly, the sleeve 13 also functions to prevent displacement and disconnection of the numerous flexible conductors and associated connectors when they are inserted into the sealant. The sleeve 13 also prevents the wires and connectors from being pushed out over the edge of vial 14. As the splice is immersed in the sealant, the sealant surrounds the splice filling all voids and thereby completely encapsulating the splice and the cable ends associated with the splice with sealant. Knob 27 formed on cap 10 functions to prevent clamp 11 from being pushed up against cap 10 by the sealant and thereby enables the sealant to flow around the clamp and to completely encase the clamp in the sealant. The assembly is inserted into the vial 14 until the sleeve 13 is coaxially disposed along the entire length of the vial and the lip 38 of the vial achieves locking engagement with groove 26 of cap 10. Preferably U-shaped retainer 40 is then positioned to securely lock cap 10 to vial 14. However, cap 10 may be secured to vial 14 by threaded engagement or by any other means well known in the art. The resultant enclosure provides a highly efective water-proof seal for the cable splice. The enclosure can immediately be placed in an underground environment or any other similar moist environment.

While the invention has been discussed in connection with telephone cables, it is to be understood that it has utility in many other applications and with cables of other sizes. The invention is also useful for enclosing splices where more than two cables are involved. Since other modifications will be apparent to the persons skilled in the art, it is to be understood that the invention is to be limited only by the lawful scope of the claims which follow.

I claim:

1. A kit for enclosing and protecting a splice between a plurality of cables comprising:
 a cap having apertures therein for receiving and passing said cables therethrough, said cap being provided with a channel having a first and second groove on the inner side thereof, said first groove enabling retention of a sleeve means;
 means for splicing said cables together;
 a vial having a body of sealant material positioned therein, said vial having one open end and adapted to accept said cap for closure; and,
 sleeve means insertable into said vial, said sleeve means capable of forming a protective enclosure about said cables and said splicing means when said sleeve means is inserted into the sealant material in said vial.

2. The kit of claim 1 wherein the end of said sleeve means is provided with a lip capable of locking engagement with said first groove of said cap.

3. The kit of claim 1 wherein said end of said vial is provided with a lip capable of locking engagement with said second groove of said cap.

* * * * *